US012354568B2

(12) United States Patent
Su et al.

(10) Patent No.: US 12,354,568 B2
(45) Date of Patent: Jul. 8, 2025

(54) DISPLAY DEVICES

(71) Applicant: TCL CHINA STAR OPTOELECTRONICS TECHNOLOGY CO., LTD., Guangdong (CN)

(72) Inventors: Rong Su, Guangdong (CN); Fan Chen, Guangdong (CN); Zhixiang Tang, Guangdong (CN); Shizhong Li, Guangdong (CN); Ailing Zhang, Guangdong (CN); Wei Liu, Guangdong (CN); Guoqing Xiang, Guangdong (CN); Xueqi Tang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 4 days.

(21) Appl. No.: 18/401,392

(22) Filed: Dec. 30, 2023

(65) Prior Publication Data

US 2025/0191552 A1 Jun. 12, 2025

(30) Foreign Application Priority Data

Dec. 7, 2023 (CN) ......................... 202311689934.6

(51) Int. Cl.
*G09G 5/00* (2006.01)
*G09G 3/20* (2006.01)

(52) U.S. Cl.
CPC ........... *G09G 5/006* (2013.01); *G09G 3/2096* (2013.01); *G09G 2320/0233* (2013.01); *G09G 2320/0242* (2013.01); *G09G 2320/0285* (2013.01); *G09G 2320/0666* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 6,201,530 | B1 * | 3/2001 | Thadani | H04N 9/69 348/E9.052 |
| 11,211,018 | B1 * | 12/2021 | Sun | G09G 3/3426 |
| 2001/0015774 | A1 * | 8/2001 | Endo | H04N 9/73 348/708 |
| 2006/0279494 | A1 * | 12/2006 | Yen | G09G 3/002 345/84 |

(Continued)

*Primary Examiner* — Dorothy Harris
(74) *Attorney, Agent, or Firm* — PV IP PC; Wei Te Chung

(57) ABSTRACT

Display devices are provided. The display device includes a display panel including subpixels and a drive assembly configured to transmit data signals to the display panel. The drive assembly includes a first storage module, a second storage module, and a fusion module. A first compensation table including first grayscale data corresponding to the subpixels is stored in the first storage module. A second compensation table including second grayscale data corresponding to the first grayscale data is stored in the second storage module. The fusion module is configured to call the first compensation table and the second compensation table, calculate target grayscale data corresponding to the first grayscale data according to the second grayscale data, and compensate the display panel according to a third compensation table merged by the target grayscale data and the first grayscale data.

16 Claims, 8 Drawing Sheets

(56) References Cited

U.S. PATENT DOCUMENTS

| | | | | |
|---|---|---|---|---|
| 2008/0166043 A1* | 7/2008 | Bassi | H04N 1/60 | 382/167 |
| 2015/0235616 A1* | 8/2015 | Wu | G09G 5/04 | 345/694 |
| 2019/0051236 A1* | 2/2019 | Deng | G09G 3/2007 | |
| 2022/0262289 A1* | 8/2022 | Su | G09G 3/006 | |

* cited by examiner

411

| gray1 |
|---|
| 0 |
| ... |
| ... |
| $D\_IN_{(n-1)}$ |
| **$D\_IN_{(n)}$** |
| $D\_IN_{(n+1)}$ |
| ... |
| ... |
| ... |
| 1020 |

412

| R1 | G1 | B1 |
|---|---|---|
| 0 | 0 | 0 |
| ... | ... | ... |
| ... | ... | ... |
| $D\_R_{(n-1)}$ | $D\_G_{(n-1)}$ | $D\_B_{(n-1)}$ |
| **$D\_R_{(n)}$** | **$D\_G_{(n)}$** | **$D\_B_{(n)}$** |
| $D\_R_{(n+1)}$ | $D\_G_{(n+1)}$ | $D\_B_{(n+1)}$ |
| ... | ... | ... |
| ... | ... | ... |
| ... | ... | ... |
| 4080 | 4080 | 4080 |

421 422

| gray3 | R2 | G2 | B2 |
|---|---|---|---|
| 0 | 0 | 0 | 0 |
| ... | ... | ... | ... |
| ... | ... | ... | ... |
| $W\_IN_{(m-1)}$ | $W\_R_{(m-1)}$ | $W\_G_{(m-1)}$ | $W\_B_{(m-1)}$ |
| **$W\_IN_{(m)}$** | **$W\_R_{(m)}$** | **$W\_G_{(m)}$** | **$W\_B_{(m)}$** |
| **$W\_IN_{(m+1)}$** | **$W\_R_{(m+1)}$** | **$W\_G_{(m+1)}$** | **$W\_B_{(m+1)}$** |
| ... | ... | ... | ... |
| ... | ... | ... | ... |
| ... | ... | ... | ... |
| 1020 | 4080 | 4080 | 3878 |

FIG. 8

| 411 | 431 | | |
|---|---|---|---|
| gray4 | R3 | G3 | B3 |
| 0 | 0 | 0 | 0 |
| ... | ... | ... | ... |
| ... | ... | ... | ... |
| D_IN$_{(n-1)}$ | W_R$_{(n-1)}$ | W_G$_{(n-1)}$ | W_B$_{(n-1)}$ |
| **D_IN**$_{(n)}$ | **W_R**$_{(n)}$ | **W_G**$_{(n)}$ | **W_B**$_{(n)}$ |
| **D_IN**$_{(n+1)}$ | **W_R**$_{(n+1)}$ | **W_G**$_{(n+1)}$ | **W_B**$_{(n+1)}$ |
| ... | ... | ... | ... |
| ... | ... | ... | ... |
| ... | ... | ... | ... |
| 1020 | 4080 | 4080 | 3878 |

FIG. 10

DISPLAY DEVICES

CROSS-REFERENCE TO RELATED APPLICATION

This application claims priority to Chinese Patent Application No. 202311689934.6, filed on Dec. 7, 2023, the disclosure of which is incorporated herein by reference in its entirety.

TECHNICAL FIELD

The present disclosure relates to the field of display technologies, and in particular, to display devices.

BACKGROUND

In traditional TFT-LCD display devices, in order to make the brightness and chromaticity characteristics of a display panel comply with human eye perception, gamma adjustment and white balance adjustment are required. During processes in the production line, gamma compensation is performed on each open cell (OC) (i.e., display panel) by automatic gamma adjustment technology, and digital gamma and color coordinates of the open cells are adjusted by using white tracking (WT) tables (i.e., white balance tables). However, due to a white balance table can only adjust one open cell, which reduces the adjustment efficiency.

Currently, in order to improve the white balance adjustment efficiency of display panels, external machine devices are generally introduced to integrate gamma adjustment and white balance adjustment into an accurate color capture (ACC) table (i.e., chrominance correction compensation table) to adjust the brightness and chromaticity of each display panel. However, there are many types of panel products, so the machine needs to store white balance tables corresponding to different types of panels, which increases machine management costs, and at the same time, there may be technical problems of mismatches between the panels and called white balance tables.

SUMMARY

In view of above, display devices are provided according to embodiments of the present disclosure. The display device includes a display panel including subpixels and a drive assembly configured to transmit data signals to the display panel. The drive assembly includes a first storage module, a second storage module, and a fusion module. A first compensation table including first grayscale data corresponding to the subpixels is stored in the first storage module. A second compensation table including second grayscale data corresponding to the first grayscale data is stored in the second storage module. The fusion module is configured to call the first compensation table and the second compensation table, calculate target grayscale data corresponding to the first grayscale data according to the second grayscale data, and compensate the display panel according to a third compensation table merged by the target grayscale data and the first grayscale data.

BRIEF DESCRIPTION OF THE DRAWINGS

The technical solutions and other beneficial effects of the present disclosure will be apparent through a detailed description of the specific embodiments of the present disclosure in conjunction with the accompanying drawings.

FIG. 8 shows a second compensation table of the display device according to an embodiment of the present disclosure.

FIG. 10 shows a third compensation table of the display device according to an embodiment of the present disclosure.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

Figure 1:
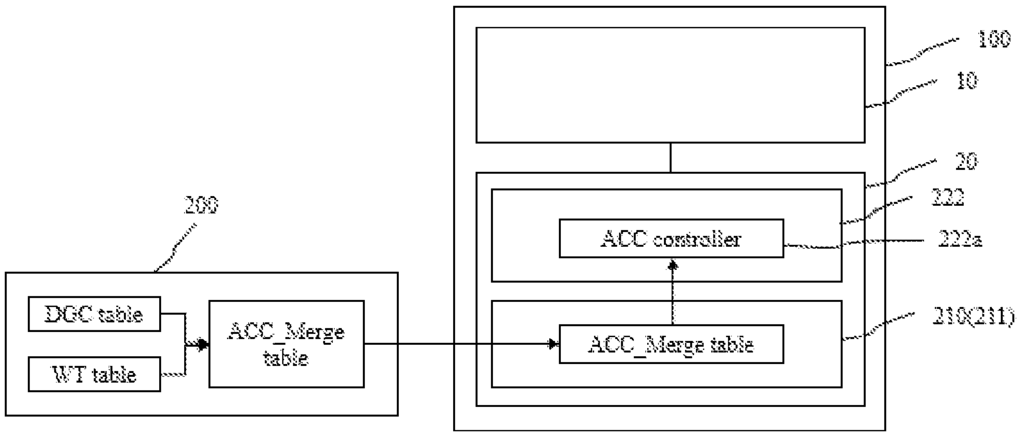
FIG. 1 (Related Art)
FIG. 1 is a structural diagram of a grayscale compensation system for a display device in related art.

Referring to FIG. 1, which illustrates a grayscale compensation system for a display device in the related art, the system includes a machine platform 200 and a display device 100. The display device 100 includes a display panel 10 and a drive assembly 20 for transmitting data signals to the display panel 10. The drive assembly 20 includes an XB circuit board 210 and a timing controller 222. The machine platform 200 internally stores a digital gamma compensation (DGC) table and a white tracking (WT) table (i.e., white balance compensation table). The DGC table and the WT table are merged inside the machine platform 200 to form a merged accurate color capture (ACC) table (i.e., chrominance correction compensation table), defined as an ACC_Merge table, which is stored in a storage module of the XB circuit board 210 of the display device 100, and then the ACC_Merge table stored in the storage module is transmitted to an accurate color capture (ACC) controller (i.e., chrominance correction controller) **222*a* through the timing controller 222 to compensate the display panel 10. Since there are many types of panel products, the machine platform 200 needs to store ACC_Merge tables corresponding to different types of panels, which increases the management costs of the machine platform 200**. At the same time, there may be technical problems of mismatches between the panels and the called chromaticity correction compensation tables.

Figure 2:
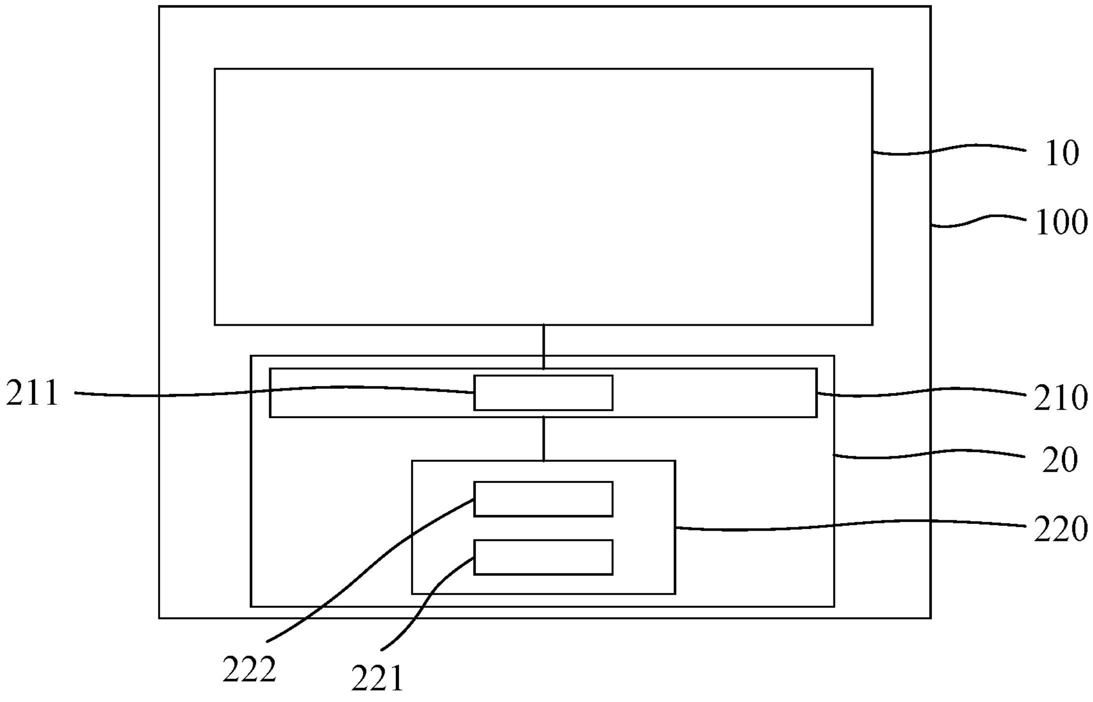
FIG. 2 is a structural diagram of a display device according to an embodiment of the present disclosure.
Figure 3:
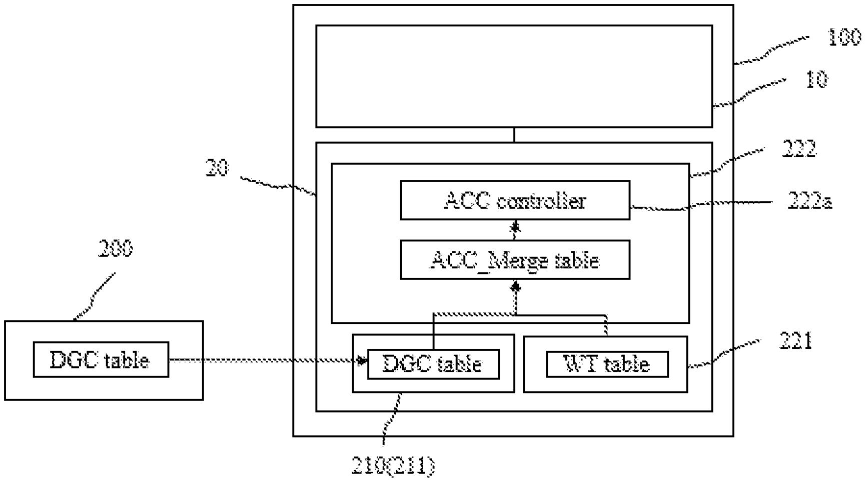
FIG. 3 is a structural diagram of a grayscale compensation system for the display device according to an embodiment of the present disclosure.
Figure 4:
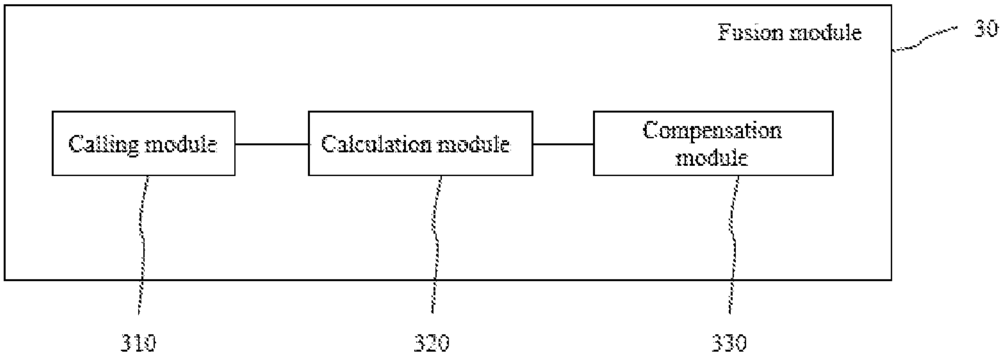
FIG. 4 is a first structural diagram of a fusion module of the display device according to an embodiment of the present disclosure.

Referring to FIG. 2 to FIG. 4, the present disclosure provides a display device 100. The display device 100 includes a display panel 10 and a drive assembly 20 for transmitting data signals to the display panel 10. The drive assembly 20 includes a fusion module 30, a first storage module 211, and a second storage module 221. The fusion module 30 includes a calling module 310, a calculation module 320, and a compensation module 330.

The calling module 310 is configured to call a first compensation table stored in the first storage module 211 and a second compensation table stored in the second storage module 221. The first compensation table includes first grayscale data corresponding to each subpixel of the display panel 10, and the second compensation table includes second grayscale data corresponding to the first grayscale data.

The calculation module 320 is configured to calculate target grayscale data corresponding to the first grayscale data according to the second grayscale data. The target grayscale data and the first grayscale data constitute a third compensation table.

The compensation module 330 is configured to compensate the display panel 10 according to the third compensation table.

It should be noted that the first compensation table is a digital gamma compensation table (DGC table), the second compensation table is a white balance compensation table (WT table), and the third compensation table is a chrominance correction compensation table (ACC_Merge table).

In the present disclosure, the first compensation table and the second compensation table that match the display panel 10 are stored in different storage modules of the drive assembly 20, and are directly merged into the third compensation table for compensation inside the display device 100, so that the machine platform 200 does not need to store different types of white balance compensation tables, and while improving the grayscale compensation efficiency, the technical problem of mismatch between the display panel 10 and the called white balance compensation table is avoided.

It should be noted that, referring to FIG. 2 and FIG. 3, the display device 100 includes the display panel 10 and the drive assembly 20. The drive assembly 20 includes an XB circuit board 210 and a CB circuit board 220. The XB circuit board 210 includes the first storage module 211, and the CB circuit board 220 includes the second storage module 221 and a timing controller 222. The first storage module 211 may be an X-board flash memory, and the second storage module 221 may be a C-board flash memory, and the fusion module 30 may be integrated in the timing controller 222. In an embodiment, the fusion module 30 may be a microcontroller unit (MCU).

It should be noted that multiple display panels 10 of the same model type all have the same CB circuit board 220, that is, the data stored in the CB circuit boards 220 of the display panels 10 of the same model type are the same, and the data stored in the CB circuit boards 220 of the display panels 10 of different model types is different. Therefore, the present disclosure only needs to provide the corresponding CB circuit board 220 according to the model type of the display panel 10, which may avoid the technical problem of mismatches between the display panel 10 and the called white balance compensation table and called chrominance correction compensation table.

It should be noted that the fusion module 30 directly calls the first compensation table stored in the first storage module 211 and the second compensation table stored in the second storage module 221, and the third compensation table merged in the fusion module 30 and integrated in the timing controller 222 is directly transmitted to the display panel 10 for grayscale compensation without being stored in storage modules of the display device 100. At the same time, one display panel 10 corresponds to one first compensation table and one second compensation table, which avoids the technical problem of mismatch between the panel and the called white balance compensation table and the called chrominance correction compensation table.

Figure 5:
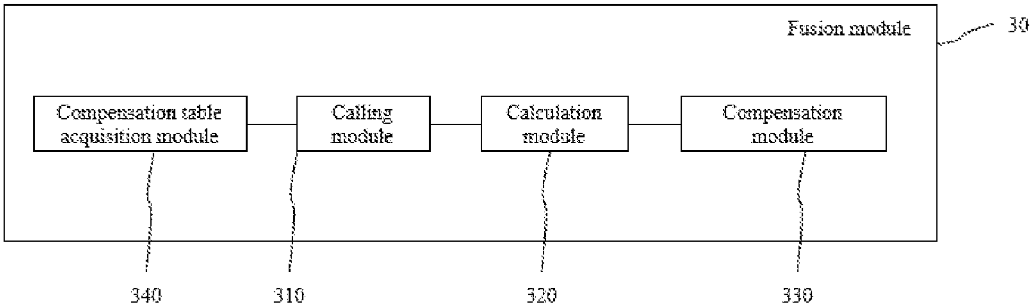
FIG. 5 is a second structural diagram of the fusion module of the display device according to an embodiment of the present disclosure.
Figures 6, 7:
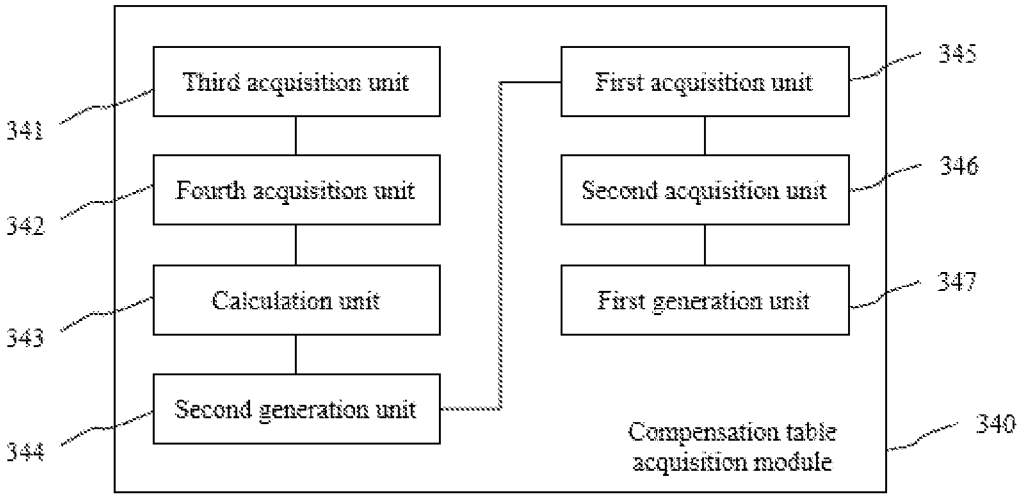
FIG. 6 is a structural diagram of a calling module of the display device according to an embodiment of the present disclosure.
FIG. 7 shows a first compensation table of the display device according to an embodiment of the present disclosure.

In the present disclosure, referring to FIG. 5 to FIG. 7, the display device 100 further includes a compensation table acquisition module 340 for acquiring the first compensation table and the second compensation table. The compensation table acquisition module 340 may include a third acquisition unit 341, a fourth acquisition unit 342, a calculation unit 343, and a second generation unit 344. The third acquisition unit 341 is configured to acquire first grayscale data 411 corresponding to each subpixel of the display panel 10. The fourth acquisition unit 342 is configured to acquire the brightness data corresponding to each subpixel of the display panel 10. The calculation unit 343 is configured to compensate the corresponding first grayscale data 411 according to the brightness data and calculate the third grayscale data 412 corresponding to the first grayscale data 411. The second generation unit 344 is configured to merge the first grayscale data 411 and the corresponding third grayscale data 412 to generate the first compensation table, and the first compensation table is stored in the first storage module 211.

In an embodiment, the first grayscale data 411 corresponding to each subpixel may include a plurality of first gray levels corresponding to the subpixels. For example, the first grayscale data 411 may be represented by 10 bits, and the first grayscale data 411 can represent a maximum of $2^{10}$ (i.e., 1024) gray levels, that is, the gray levels of the first grayscale data 411 may range from 0 to 1023.

In an embodiment, the brightness data of each display panel 10 includes the brightness of a central area of the display panel 10. For different display panels 10, the position or size of the collected central area may be set as needed. Each display panel 10 is lit based on the first grayscale data 411. For example, when the gray level of the red subpixel of the collected display panel 10 is 128, then the brightness of the red subpixel is the brightness under the gray level of 128.

Since after lighting each display panel 10 based on the first grayscale data 411, the brightness of each display panel 10 does not fully meet expectations, there are subpixels to be compensated in each display panel 10. Therefore, the first grayscale data 411 is first compensated based on the brightness data of the display panel 10 to obtain the third grayscale data 412 corresponding to the first grayscale data 411, so that a gamma curve obtained based on the third grayscale data 412 is more in line with the requirements.

In an embodiment, the third grayscale data 412 corresponding to each subpixel includes a plurality of third gray levels corresponding to the subpixels. For example, the third grayscale data 412 may be represented by 12 bits. On this basis, the third grayscale data 412 can represent a maximum of $2^{12}$ (i.e., 4096) gray levels, that is, gray levels of the third grayscale data 412 may range from 0 to 4095.

For example, referring to FIG. 7, the first compensation table includes the first grayscale data 411 and the third grayscale data 412. Among them, the first gray levels gray1 range from 0 to 1020, and the third gray levels include three columns of gray levels R1, G1, and B1. The third gray levels range from 0 to 4080. For any first gray level $D\_IN_{(n)}$, there is a third gray level corresponding to the first gray level.

Furthermore, the first grayscale data 411 is arranged in a column in sequence, and n in the first gray level $D\_IN_{(n)}$ represents a sequence number of the row where the first gray level $D\_IN_{(n)}$ is located in the first grayscale data 411. It is worth noting that the third grayscale data 412 is also arranged in a column in sequence, and n in the third gray levels $D\_R_{(n)}$, $D\_G_{(n)}$, and $D\_B_{(n)}$ has the same meaning as that of the first gray level $D\_IN_{(n)}$.

Therefore, after acquiring the third gray levels $D\_R_{(n)}$, $D\_G_{(n)}$, and $D\_B_{(n)}$ corresponding to the first gray level $D\_IN_{(n)}$, the second generation unit 344 of the present disclosure merges the plurality of first gray levels $D\_IN_{(n)}$ and the plurality of third gray levels $D\_R_{(n)}$, $D\_G_{(n)}$, and $D\_B_{(n)}$ to form the first compensation table as shown in FIG. 7 of the present disclosure.

It should be noted that the meaning of the term "merge" is to summarize or bring together different data into the same table. In practical applications, the term "merge" may also refer to the process of processing different data and forming a new data set from the processed data. Different meanings correspond to different merging methods.

It should be noted that the first compensation table may be stored in the XB flash memory of the display device 100, and the calling module 310 may directly call the data in the first compensation table from the XB flash memory. The first compensation table may be preset in the machine platform 200, or directly obtained inside the display device 100.

That is, the third acquisition unit 341, the fourth acquisition unit 342, the calculation unit 343, and the second generation unit 344 of the compensation table acquisition module 340 may be integrated in the fusion module 30 of the display device 100 or integrated in the machine platform 200. That is, the first compensation table may be generated in the display device 100, or may be generated in the machine platform 200 and then stored in the XB flash memory of the display device 100.

In the display device 100 of the present disclosure, referring to FIG. 5 to FIG. 8, the compensation table acquisition module 340 further includes a first acquisition unit 345, a second acquisition unit 346, and a first generation unit 347. The first acquisition unit 345 is configured to acquire the second grayscale data 421 corresponding to the third grayscale data 412. The second acquisition unit 346 is configured to acquire fourth grayscale data 422 corresponding to the second grayscale data 421. The first generation unit 347 is configured to merge the second grayscale data 421 and the corresponding fourth grayscale data 422 to generate the second compensation table, and the second compensation table is stored in the second storage module 221.

In the embodiments, the second storage module 221 may be a CB flash memory, that is, the second compensation table may be stored in the CB flash memory of the display device 100.

In an embodiment, a number of bits of the second grayscale data 421 is different from a number of bits of the third grayscale data 412, and a number of bits of the fourth grayscale data 422 is different from a number of bits of the second grayscale data 421.

In an embodiment, the second grayscale data 421 includes a plurality of second gray levels corresponding to the subpixels. For example, similar to the first grayscale data 411, the second grayscale data 421 may be represented by 10 bits. The second grayscale data 421 can represent a maximum of 1024 gray levels, that is, gray levels of the second grayscale data 421 may range from 0 to 1023.

In an embodiment, the fourth grayscale data 422 includes a plurality of fourth gray levels corresponding to the subpixels. For example, similar to the third grayscale data 412, the fourth grayscale data 422 can be represented by 12 bits. The fourth grayscale data 422 can represent a maximum of 4096 gray levels, that is, gray levels of the fourth grayscale data 422 may range from 0 to 4095.

Referring to FIG. 8, the second compensation table includes the second grayscale data 421 and the fourth grayscale data 422. Among them, the second grayscale data 421 is provided in one column, and the fourth grayscale data 422 is provided with three columns of gray levels R2, G2, and B2. The second gray level in the second grayscale data 421 corresponds to any subpixel of the display panel 10, and the fourth gray levels in the fourth grayscale data 422 correspond to different types of subpixels of the display panel 10.

At the same time, a range of the second gray level gray3 may be from 0 to 1020, a range of the fourth gray level R1 corresponding to the red subpixel may be from 0 to 4080, and a range of the fourth gray level G1 corresponding to the green subpixel may also be from 0 to 4080, and a range of the fourth gray level B1 corresponding to the blue subpixel may be from 0 to 3878.

Therefore, after acquiring the fourth grayscale data 422 corresponding to the second grayscale data 421, the first generation unit 347 is configured to merge the second grayscale data 421 and the fourth grayscale data 422 to generate the second compensation table shown in FIG. 8 of the present disclosure.

It should be noted that the calling module 310 may directly call the data in the second compensation table from the CB flash memory. The second compensation table may be preset in the machine platform 200, or directly obtained inside the display device 100.

That is, the first acquisition unit 345, the second acquisition unit 346, and the first generation unit 347 of the compensation table acquisition module 340 may be integrated in the fusion module 30 of the display device 100 or integrated in the machine platform 200, that is, the second compensation table may be generated in the display device 100, or may be generated in the machine platform 200 and then stored in the CB flash memory of the display device 100.

Figure 9:
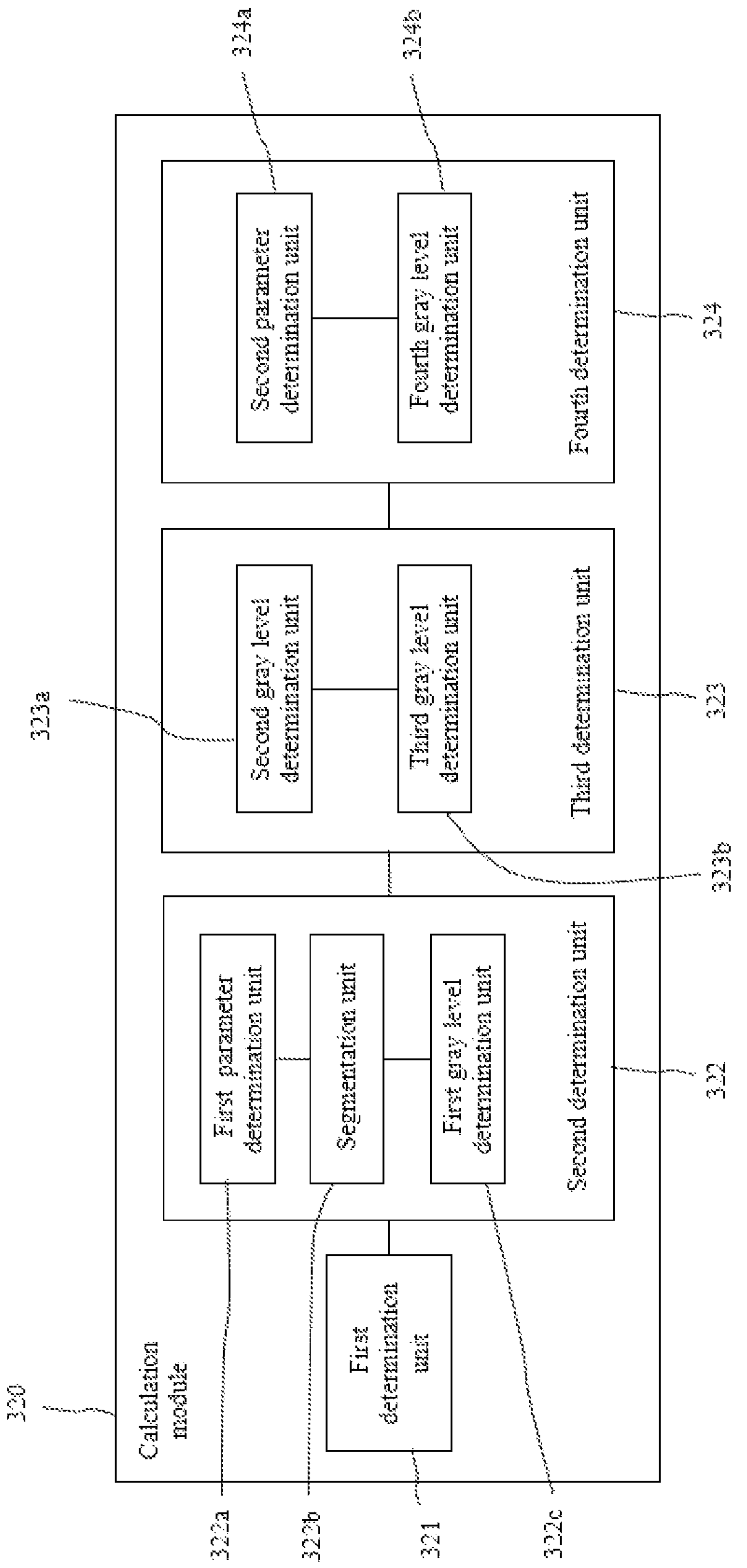
FIG. 9 is a structural diagram of a calculation module in the display device according to an embodiment of the present disclosure.

In the display device 100 of the present disclosure, the target grayscale data 431 includes a plurality of target gray levels. Referring to FIG. 9 and FIG. 10, the calculation module 320 includes a first determination unit 321, a second determination unit 322, a third determination unit 323, and a fourth determination unit 324. The first determination unit 321 is configured to calculate the plurality of third gray levels corresponding to the plurality of the first gray levels according to the first compensation table. The second determination unit 322 is configured to calculate the plurality of second gray levels corresponding to the plurality of third gray levels according to the plurality of third gray levels and first parameters. The third determination unit 323 is configured to calculate the plurality of fourth gray levels corresponding to the plurality of second gray levels according to the second compensation table. The fourth determination unit 324 is configured to calculate a target grayscale data 431 including the plurality of the target gray levels according to the plurality of the fourth gray levels and second parameters.

In the embodiments, referring to FIG. 10, in the third compensation table, there is a mapping relationship between the target gray levels in the target grayscale data 431 and the first gray levels in the first grayscale data 411. After the third compensation table is merged in the fusion module 30, it can be directly transmitted to the display panel 10 for grayscale compensation.

In the embodiments, a number of bits of the first grayscale data 411 and a number of bits of the second grayscale data 421 are the same. A number of bits of the third grayscale data 412, a number of the bits the fourth grayscale data 422, and a number of bits of the target grayscale data 431 are the same. For example, the number of the bits of the first grayscale data 411 and the number of the bits of the second grayscale data 421 may each be 10 bits, and the number of the bits of the third grayscale data 412, the number of the bits the fourth grayscale data 422, and the number of the bits of the target grayscale data 431 may each be 12 bits.

In an embodiment, the first gray level $D\_IN_{(n)}$ in the first compensation table may be 700, and the corresponding third gray level $D\_R_{(n)}$ may be 3054.

It should be noted that the number of the bits of the first grayscale data 411 and the number of the bits of the second grayscale data 421 may be different, and the number of the bits of the third grayscale data 412 and the number of the bits of the fourth grayscale data 412 may be different. It is only necessary that the number of the bits of the first grayscale data 411 is less than the number of the bits of the third grayscale data 412, the number of the bits of the second grayscale data 421 is less than the number of the bits of the fourth grayscale data 422, and the number of the bits of the fourth grayscale data 422 is equal to the number of the bits of the target grayscale data.

For example, on a condition that the number of the bits of the first grayscale data 411 is 10 bits and the number of the bits of the third grayscale data 412 is 12 bits, the number of the bits of the second grayscale data 421 may be 8 bits, and the number of the bits of the fourth grayscale data 422 may be 10 bits.

In the display device 100 of the present disclosure, referring to FIG. 9, one third gray level corresponds to at least two second gray levels. The second determination unit 322 includes a first parameter determination unit 322*a*, a segmentation unit 322*b*, and a first gray level determination unit 322*c*. The first parameter determination unit 322*a* is configured to calculate the first parameters according to the number of the bits of the second grayscale data 421, the number of the bits of the third grayscale data 412, and a first formula. The segmentation unit 322*b* is configured to segment the plurality of third gray levels into corresponding first numerical values and second numerical values according to the first parameters. The first gray level determination unit 322*c* is configured to calculate the plurality of second gray levels corresponding to the plurality of third gray levels according to the first numerical values.

In an embodiment, the first formula is $ratio = 2^{|WT_{NBit} - DGC_{OUTBit}|}$, where ratio indicates the first parameter, $WT_{INBit}$ indicates the number of the bits of the second grayscale data 421, $DGC_{OUTBit}$ indicates the number of the bits of the third grayscale data 412. For example, a difference between the number of the bits of the second grayscale data 421 and the number of the bits of the third grayscale data 412 is 2 bits, and thus the first parameter ratio is $2^2$.

In an embodiment, taking that the third gray level $D\_R_{(n)}$ is 3054 as an example, where 3054 can be converted into binary form, which is 101111101110, a total of 12 bits. 3054 can be divided into a first numerical value and a second numerical value, the higher 10 bits of 3054 are 1011111011, which is 763 in a decimal form, which is the first numerical value, and the lower 2 bits are 10, which is 2 in a decimal form, which is the second numerical value. The above process of calculating the higher 10 bits and the lower 2 bits may also be performed as follows in the decimal system: first a ratio of 3054 and 4 is calculated to and get the quotient as 763 and the remainder as 2, where the quotient 763 is a decimal digit of the higher 10 bits of 3054 in a binary form, and the remainder 2 is a decimal digit of the lower 2 bits of 3054 in the binary form.

In this embodiment, the first numerical value may be 763, and the second gray level 763 and the second gray level 764 adjacent to the second gray level 763 may be determined to be the plurality of second gray levels.

In the display device 100 of the present disclosure, the third determination unit 323 includes a third gray level determination unit 323*a* and a second gray level determination unit 323*b*. The third gray level determination unit 323*a* is configured to calculate at least two second gray levels corresponding to the first numerical value according to the first numerical value. The second gray level determination unit 323*b* is configured to match the plurality of fourth gray levels corresponding to each of the at least two second gray levels in the second compensation table.

For example, referring to FIG. 8, the first numerical value is 763. At this time, the first numerical value may correspond to two second gray levels, which are $W\_IN_{(m)}$ and $W\_IN_{(m+1)}$ respectively, where m has a similar meaning to n, and also represents a sequence number of the row where the gray level is correspondingly located. The gray level $W\_IN_{(m)}$ may be 763, and the gray level $W\_IN_{(m+1)}$ may be 764. That is, the two second gray levels corresponding to the first numerical value may be two adjacent second gray levels. For another example, the gray level $W\_IN_{(m)}$ may be 763, and the gray level $W\_IN_{(m+1)}$ may be 762.

At the same time, referring to FIG. 8, when the second gray level $W\_IN_{(m)}$ is 763, the corresponding fourth gray levels include $W\_R_{(m)}$, $W\_G_{(m)}$ and $W\_B_{(m)}$; when the second gray level $W\_IN_{(m+1)}$ is 764, the corresponding fourth gray levels include $W\_R_{(m+1)}$, $W\_G_{(m+1)}$ and $W\_B_{(m+1)}$. For example, $W\_R_{(m)}$, $W\_G_{(m)}$ and $W\_B_{(m)}$ are respectively the gray levels of red subpixels, green subpixels, and blue subpixels corresponding to the gray level 763. The gray level $W\_R_{(m)}$ may be 2865, the gray level $W\_G_{(m)}$ may be 2885, and the gray level $W\_B_{(m)}$ may be 2843. Similarly, the gray level $W\_R_{(m+1)}$ may be 2874, the gray level $W\_G_{(m+1)}$ may be 2891, and the gray level $W\_B_{(m+1)}$ may be 2849.

In the display device 100 of the present disclosure, referring to FIG. 9, the fourth determination unit 324 includes a second parameter determination unit 324*a* and a fourth gray level determination unit 324*b*. The second parameter determination unit 324*a* is configured to calculate second parameters according to a second formula and based on the second numerical values and the first parameters. The fourth gray level determination unit 324*b* is configured to calculate the plurality of target gray levels according to a third formula and based on the second parameters and the corresponding fourth gray levels to obtain the target grayscale data 431.

In an embodiment, the second formula is $$mod = \frac{D_{OUT(n)}\% \text{ ratio}}{\text{ratio}} \times [W_{z(m+1)} - W_{z(m)}],$$

where $D_{OUT(n)}$ indicates the third gray level of different color subpixels in the third grayscale data 412, % indicates the modulus, ratio indicates the first parameter, mod indicates the second parameter, $W_{Z(m)}$ and $W_{Z(m+1)}$ indicate the fourth gray levels of different color subpixels in the fourth grayscale data 422.

For example, taking the red subpixel as an example, $D_{OUT(n)}$ may be 3054, ratio may be 4, $D_{OUT(n)}$% ratio may be the second numerical value, such as 2, $W_{R(m+1)}$ may be the second gray level 763, the corresponding fourth gray level is 2874, $W_{R(m)}$ may be the second gray level 764, and the corresponding fourth gray level is 2865, and thus, the second parameter can be 0.5*(2874-2865)=4.5.

In an embodiment, the third formula is $W_{Z(n)}=W_{Z(m)}+$[mod], where [mod] indicates a numerical value obtained by rounding the second parameter mod, and $W_{Z(n)}$ indicates the target gray level of different color subpixels in the target grayscale data 431.

For example, when mod is 4.5, round down and [mod]=4, so the corresponding gray level is 2865+4=2869. Of course, the present disclosure may not round the second parameter mod first, but round a sum of W_R(m) and mod to obtain the corresponding target gray level.

In an embodiment, an initial gray level corresponding to the target gray level 2869 is the first gray level 700, that is, there is a mapping relationship between the first gray level and the target gray level. In addition, the target gray level 2869 corresponds to the red subpixel. In the present disclosure, for the first gray level, the third gray level, the second gray level, the fourth gray level, and the target gray level, each gray level may correspond to a corresponding type of subpixel. For example, in FIG. 3, although the second grayscale data 421 is shown as one column, in practical applications, it can be understood that the second grayscale data 421 may also be three columns, corresponding to the red subpixel, the green subpixel, and the blue subpixel.

In the present disclosure, since the first compensation table and the second compensation table are merged to obtain the third compensation table, there is a mapping relationship between the second gray level and the third gray level. That is, a process of obtaining the third compensation table includes a process of establishing a mapping relationship between the second gray level and the third gray level. In addition, there is a mapping relationship between the fourth gray level and the second gray level, and the mapping relationship between the fourth gray level and the second gray level may be set in advance. It can be understood that the present disclosure is not limited to the mapping relationship between the fourth gray level and the second gray level.

It should be noted that the above process of using linear interpolation to generate the third compensation table may also be called secondary generation, and other interpolation methods can also be used to generate the third compensation table. The generated third compensation table does not need to be stored in the storage module. The timing controller 222 may directly transmit the third compensation table to an accurate color capture (ACC) controller to compensate the current grayscale to be compensated according to the third compensation table, so as to obtain the target gray level in the target grayscale data 431, thereby performing digital gamma adjustment and compensation on each panel.

Referring to FIG. 10, the third compensation table may include first grayscale data 411 and target grayscale data 431. The first gray levels gray4 in the third compensation table may be the same as the first gray levels gray1 in the first compensation table, that is, the first grayscale data 411 in the third compensation table may be the same as the first grayscale data 411 in the first compensation table. The target grayscale data 431 may include 3 columns of R3, G3, and B3, and there is a mapping relationship between the target grayscale data 431 and the fourth grayscale data 422.

In the display device 100 of the present disclosure, the compensation module 330 is configured to adjust corresponding gamma driving voltages according to the target gray levels in the target grayscale data, and drive the subpixels to display according to the gamma driving voltages.

In an embodiment, the gamma driving voltage may be a data voltage on a data line corresponding to the subpixel, and is configured to drive the subpixel to achieve a target gray level.

Figure 11:
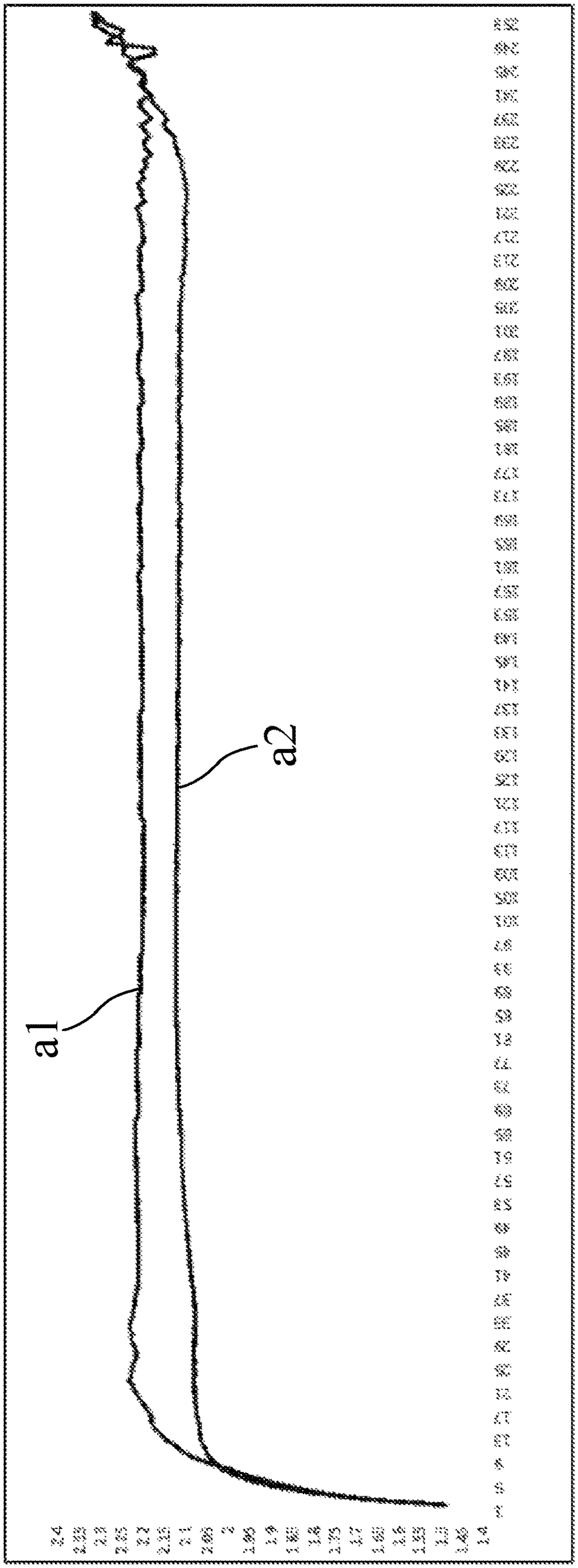
FIG. 11 is a schematic diagram of gamma curves of the display device before and after compensation according to an embodiment of the present disclosure.

Referring to FIG. 11, which is a schematic diagram of gamma curves before and after compensation according to an embodiment of the present disclosure, in which the abscissa is the grayscale, the ordinate is the gamma value, a1 shows a gamma curve after compensation, and a2 shows a gamma curve before compensation. It can be seen that using the third compensation table for compensation can make the compensated gamma curve closer to the gamma 2.2 curve.

Figure 12:
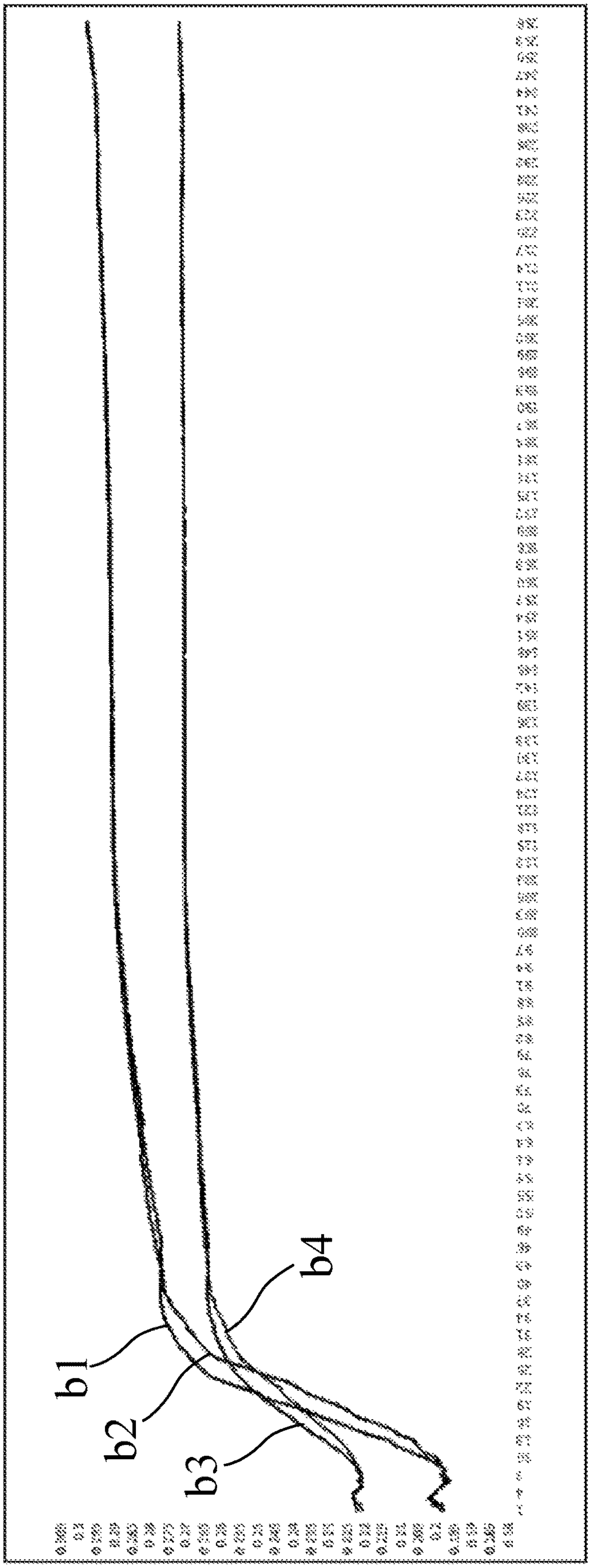
FIG. 12 is a schematic diagram of color coordinate curves of the display device before and after compensation according to an embodiment of the present disclosure.

Referring to FIG. 12, which shows a schematic diagram of color coordinate curves before and after compensation according to an embodiment of the present disclosure, in which the abscissa is the grayscale, and the ordinate is the color coordinate of the white balance, b1 shows a color coordinate curve in a y direction before compensation, b2 shows a color coordinate curve in the y direction after compensation, b3 shows a color coordinate curve in a x direction before compensation, and b4 shows a color coordinate curve in the x direction after compensation. It can be seen that after using the third compensation table for compensation, the color coordinate curves remain unchanged, and grayscale translation occurs only in a horizontal direction (i.e. the x direction).

Since the present disclosure involves grayscale translation and does not involve changes in color coordinates, it does not affect the chromaticity compensation of WT and does not require modification of hardware. Therefore, in the present disclosure, by generating the WT table twice, without changing the color coordinates and without increasing hardware costs, grayscale compensation for each display panel 10 may be realized, the phenomenon of uneven gamma curve may be improved, the grayscale compensation efficiency may be improved, and the production cycle time may be shortened.

At the same time, in the structure in the related art illustrated in FIG. 1, the DGC table and the WT table are stored inside the machine platform 200 and merged inside the machine platform 200 to form the ACC_Merge table, the ACC_Merge table is stored in the storage module of the XB circuit board 210 of the display device 100, and then transmitted to the ACC controller 222*a* through the timing controller 222 to compensate the display panel 10. Relatively, in the structure of the present disclosure illustrated in FIG. 3, the DGC table of the target display panel 10 is first obtained through the machine platform 200, and then the DGC table corresponding to the target display panel 10 is stored in the first storage module 211 of the XB circuit board 210 of the display device 100, at the same time, the second storage module 221 of the CB circuit board 220 stores the WT table corresponding to the target display panel 10, and then the DGC table in the first storage module 211 and the WT table in the second storage module 221 are called by the fusion module 30 integrated in the timing controller 222 and are merged into the ACC_Merge table in the fusion module 30, and at the same time, the merged ACC_Merge table is directly transmitted to the ACC controller 222*a* to compensate the display panel 10.

Therefore, compared with the related art, the DGC table and WT table of the present disclosure are stored in the drive assembly 20 of the display device 100. At the same time, the DGC table and the WT table are merged inside the drive assembly 20, and may be directly transmitted to the ACC controller after merged. The merged ACC_Merge table is not stored in the drive assembly 20, which reduces the load on the machine platform 200. At the same time, the WT table corresponds to the display panel 10, which avoids the technical problems of mismatches between the panels and the called white balance compensation table and the called chromaticity correction compensation table.

In the above embodiments, each embodiment is described with its own emphasis. For parts that are not described in detail in a certain embodiment, please refer to the relevant descriptions of other embodiments.

The display devices provided by the embodiments of the present disclosure have been introduced in detail above. This paper uses specific examples to illustrate the principles and implementation methods of the present disclosure. The description of the above embodiments is only used to help understand the technical solutions and main ideas of the present disclosure. Those of ordinary skill in the art should understand: it is still possible to modify the technical solutions recorded in the foregoing embodiments, or to equivalently replace some of the technical features; however, these modifications or substitutions do not cause the essence of the corresponding technical solutions to depart from the scope of the technical solutions of the embodiments of the present disclosure.

What is claimed is:

1. A display device, comprising:

a display panel, comprising a plurality of subpixels; and a drive assembly, configured to transmit data signals to the display panel and comprising:

a first storage module, storing a first compensation table comprising first grayscale data corresponding to the subpixels, wherein the first compensation table is a digital gamma compensation table;

a second storage module, storing a second compensation table comprising second grayscale data corresponding to the first grayscale data, wherein the second compensation table is a white balance compensation table; and a fusion module, configured to call the first compensation table and the second compensation table, calculate target grayscale data corresponding to the first grayscale data according to the second grayscale data, and compensate the display panel according to a third compensation table merged by the target grayscale data and the first grayscale data.

2. The display device according to claim 1, wherein the first compensation table further comprises third grayscale data corresponding to the first grayscale data, and the fusion module is further configured to acquire the second grayscale data corresponding to the third grayscale data, acquire fourth grayscale data corresponding to the second grayscale data, merge the second grayscale data and the fourth grayscale data to generate the second compensation table, and store the second compensation table in the second storage module.

3. The display device according to claim 2, wherein a number of bits of the second grayscale data is different from a number of bits of the third grayscale data, and a number of bits of the fourth grayscale data is different from a number of bits of the second grayscale data.

4. The display device according to claim 3, wherein the first grayscale data comprises a plurality of first gray levels, the third grayscale data comprises a plurality of gray levels, the second grayscale data comprises a plurality of second gray levels, the fourth grayscale data comprises a plurality of fourth gray levels, and the target grayscale data comprises a plurality of target gray levels; and wherein the fusion module is configured to calculate the plurality of third gray levels corresponding to the plurality of the first gray levels according to the first compensation table, calculate the plurality of second gray levels corresponding to the plurality of third gray levels according to the plurality of third gray levels and first parameters, calculate the plurality of fourth gray levels corresponding to the plurality of second gray levels according to the second compensation table, and calculate the target grayscale data according to the plurality of the fourth gray levels and second parameters.

5. The display device according to claim 4, wherein each of the third gray levels corresponds to at least two of the second gray levels, and the fusion module is further configured to calculate the first parameters according to the number of the bits of the second grayscale data, the number of the bits of the third grayscale data, and a first formula, segment the plurality of third gray levels into corresponding first numerical values and second numerical values according to the first parameters, and calculate the plurality of second gray levels corresponding to the plurality of third gray levels according to the first numerical values.

6. The display device according to claim 5, wherein the first formula is ratio=$2^{|WT_{INBit}-DGC_{OUTBit}|}$, where ratio indicates one of the first parameters, $WT_{INBit}$ indicates the number of the bits of the second grayscale data, $DGC_{OUTBit}$ indicates the number of the bits of the third grayscale data.

7. The display device according to claim 5, wherein the fusion module is further configured to calculate at least two second gray levels of the second gray levels corresponding to each of the first numerical values according to each of the first numerical values, and match the plurality of fourth gray levels corresponding to each of the at least two second gray levels in the second compensation table.

8. The display device according to claim 5, wherein the fusion module is further configured to calculate the second parameters according to a second formula and based on the second numerical values and the first parameters, and calculate the plurality of target gray levels according to a third formula and based on the second parameters and the corresponding fourth gray levels to obtain the target grayscale data.

9. The display device according to claim 8, wherein the second formula is $$\text{mod} = \frac{D_{OUT(n)}\%\ \text{ratio}}{\text{ratio}} \times [W_{z(m+1)} - W_{z(m)}],$$

where $D_{OUT(n)}$ indicates one of the third gray levels of different color subpixels in the third grayscale data, % indicates a modulus, ratio indicates one of the first parameters, mod indicates one of the second parameters, $W_{Z(m)}$ and $W_{Z(m+1)}$ indicate the fourth gray levels of different color subpixels in the fourth grayscale data; and wherein the third formula is $W_{Z(n)}=W_{Z(m)}+[mod]$, where [mod] indicates a numerical value obtained by rounding one of the second parameters, and $W_{Z(n)}$ indicates one of the target gray levels of different color subpixels in the target grayscale data.

10. The display device according to claim 3, wherein the number of the bits of the fourth grayscale data is equal to a number of bits of the target grayscale data.

11. The display device according to claim 10, wherein the number of the bits of the first grayscale data is less than the number of the bits of the third grayscale data, and the number of the bits of the second grayscale data is less than the number of the bits of the fourth grayscale data.

12. The display device according to claim 2, wherein the fusion module is further configured to acquire the first grayscale data corresponding to the subpixel of the display panel, acquire brightness data corresponding to the subpixels of the display panel, compensate the first grayscale data according to the brightness data and calculate the third grayscale data corresponding to the first grayscale data, merge the first grayscale data and the third grayscale data to generate the first compensation table, and store the first compensation table in the first storage module.

13. The display device according to claim 1, wherein the drive assembly comprises:

a first circuit board, comprising the first storage module; and a second circuit board, comprising the second storage module and a timing controller, wherein the fusion module is integrated in the timing controller.

14. The display device according to claim 13, wherein the first circuit board is an XB circuit board, and the second circuit board is a CB circuit board; the first storage module is a X-board flash memory, and the second storage module is a C-board flash memory; and the fusion module is a micro-controller unit.

15. The display device according to claim 13, wherein data stored in the second circuit board is configured to change with a model type of the display panel.

16. The display device according to claim 1, wherein the third compensation table merged in the fusion module is directly transmitted to the display panel for grayscale compensation without being stored in any storage module of the display device.

* * * * *